(12) United States Patent
Yoshida

(10) Patent No.: US 9,025,047 B2
(45) Date of Patent: May 5, 2015

(54) PHOTOGRAPHING APPARATUS AND METHOD

(71) Applicant: Samsung Electronics Co., Ltd., Suwon-si, Gyeonggi-do (KR)

(72) Inventor: Takahiko Yoshida, Sapporo (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/102,597

(22) Filed: Dec. 11, 2013

(65) Prior Publication Data

US 2014/0168466 A1 Jun. 19, 2014

(30) Foreign Application Priority Data

Dec. 13, 2012 (JP) ................................. 2012-272600
Jul. 24, 2013 (KR) ........................ 10-2013-0087606

(51) Int. Cl.
*H04N 9/73* (2006.01)
*H04N 5/222* (2006.01)
*H04N 5/235* (2006.01)

(52) U.S. Cl.
CPC ............. *H04N 9/735* (2013.01); *H04N 5/2352* (2013.01)

(58) Field of Classification Search
CPC . H04N 5/2352; H04N 1/6077; H04N 9/3182; H04N 9/73; H04N 1/6086
USPC ................. 348/229.1, 223.1–224.1, 370, 371
See application file for complete search history.

(56) References Cited

U.S. PATENT DOCUMENTS

| 5,568,194 | A | 10/1996 | Abe | |
|---|---|---|---|---|
| 2006/0152603 | A1* | 7/2006 | Enge et al. | 348/234 |
| 2011/0157412 | A1* | 6/2011 | Yoshida | 348/223.1 |
| 2011/0157413 | A1* | 6/2011 | Yoshida | 348/223.1 |

FOREIGN PATENT DOCUMENTS

| JP | 3569352 B2 | 9/2004 |
|---|---|---|
| JP | 2007-124292 A | 5/2007 |
| JP | 2010-187113 A | 8/2010 |
| JP | 2012-134678 A | 7/2012 |

* cited by examiner

*Primary Examiner* — Nhan T Tran
*Assistant Examiner* — Chan Nguyen
(74) *Attorney, Agent, or Firm* — Drinker Biddle & Reath LLP

(57) ABSTRACT

An electronic apparatus includes an exposure difference value calculator that calculates an exposure difference between a flash turned-off image and a flash turned-on image, a flash mixture ratio calculator that calculates first flash mixture ratio in blocks, a subject area selector that selects a block having maximum first flash mixture ratio and selects an area including the selected block and a block having first flash mixture ratio ranging between the maximum value and a threshold value, a flash light color balance calculator that calculates color balance of the selected area from the flash turned-on image, a flash mixture ratio correction unit that calculates second flash mixture ratio by multiplying the first flash mixture ratio by a coefficient, and a white balance gain calculator that calculates white balance gain in the blocks based on the second flash mixture ratio, the calculated color balance, and a color balance of normal light.

15 Claims, 4 Drawing Sheets

PHOTOGRAPHING APPARATUS AND METHOD

RELATED APPLICATIONS

This application claims the priority benefit of Japanese Patent Application No. 2012-272600, filed on Dec. 13, 2012, in the Japanese Patent Office and Korean Patent Application No. 10-2013-0087606, filed on Jul. 24, 2013, in the Korean Intellectual Property Office, the disclosures of which are incorporated herein in their entirety by reference.

BACKGROUND

1. Field

One or more embodiments relate to an electronic apparatus, e.g., a photographing apparatus, and a method.

2. Description of the Related Art

In electronic photographing apparatuses such as digital still cameras, white balance correction, whereby white balance is corrected, is widely known. In white balance correction according to the related art, the same white balance gain is applied to all pixels.

For example, in a scene in which normal light is dark, photographing is performed by emitting flash light so as to solve a problem of a lack of exposure. In this case, a white balance gain is calculated in a scene in which normal light and flash light are mixed according to the amount of emitted flash light. Since a subject at a short distance from a digital still camera has a high dependency on flash light, an appropriate white balance may be obtained. However, a subject that is distant from the digital still camera has an increasing dependency on normal light. In this case, when normal light is light emitted from a fluorescent lamp, a color temperature difference between normal light and flash light increases. Thus, an inappropriate white balance occurs, and accordingly, an image of a white subject looks yellow.

In order to solve these problems, there are the following related art. A technique whereby a flash turned-on image and a flash turned-off image are compared with each other so as to calculate a flash mixture ratio, to calculate an optimal white balance gain in a unit of a pixel from the flash mixture ratio, and to apply the white balance gain, is known. In the technique, a light source color of flash light and a light source color of normal light are linearly interpolated at the flash mixture ratio so as to calculate the white balance gain. The light source color of flash light uses a value obtained when all of the previously-measured flash light is irradiated on a subject so that the white balance gain may be calculated based on the flash mixture ratio.

Also, there are other techniques. A flash turned-on image and a flash turned-off image are synthesized according to a threshold value and a synthesis ratio based on a brightness value in each pixel so as to generate an image. The brightness of the flash turned-on image and the brightness of the flash turned-off image are compared with each other so as to calculate a white balance gain on a subject based on image data regarding an area of the flash turned-on image. A brightness difference that exceeds the threshold value or a white balance gain is accurately calculated even from a subject in which a white balance gain varies smoothly or a brightness value varies rapidly.

SUMMARY

One or more embodiments include an electronic apparatus (e.g., a photographing apparatus) and method, whereby, even when a white balance gain obtained by turning on a flash is unclear (i.e., an externally-installed flash is used or flash light is not directly irradiated on a subject, like in bounce emission), an appropriate white balance gain may be calculated.

Additional aspects will be set forth in part in the description which follows and, in part, will become apparent from the description, or may be learned by practice of the presented embodiments.

According to one or more embodiments, an electronic apparatus includes: an exposure difference value calculator that calculates an exposure difference value from a difference between an exposure control value of a first image captured when a flash is turned off and an exposure control value of a second image captured when the flash is turned on; a flash mixture ratio calculator that calculates a first flash mixture ratio in blocks by comparing a signal value of the second image with a signal value of the first image, where the signal value of the second image is obtained by multiplying the signal value of the first image by the exposure difference value; a subject area selector that selects a block in which the first flash mixture ratio is a maximum value and selects an area including the selected block and a block in which the first flash mixture ratio ranges between the maximum value and a threshold value; a flash light color balance calculator that calculates a color balance of the selected area from the second image when the flash is turned on; a flash mixture ratio correction unit that calculates a coefficient in which the maximum value is 1 and calculates a second flash mixture ratio by multiplying the first flash mixture ratio by the calculated coefficient; and a white balance gain calculator calculating a white balance gain in the blocks based on the second flash mixture ratio, the color balance calculated by the flash light color balance calculator, and a color balance of normal light.

According to the configuration, since an area including the block in which a first flash mixture ratio ranges from the maximum value of first flash mixture ratios and a threshold value is selected, and the second flash mixture ratio is applied to a color balance of the selected area of the second image when a flash is turned on and a color balance of normal light so as to calculate a white balance gain, even when a white balance gain obtained by turning on the flash is unclear, an appropriate white balance gain may be calculated.

Each block of the blocks may include one pixel. The flash mixture ratio calculator may calculate the first flash mixture ratio in the pixel, and the white balance calculator may calculate the white balance gain in the pixel. According to the configuration, since the white balance gain may be calculated in each pixel, a white balance may be controlled in each pixel.

Each block of the blocks may be an area including a plurality of pixels. The flash mixture ratio calculator may calculate the first flash mixture ratio in the area, and the white balance calculator may calculate the white balance gain in the area. According to the configuration, since the white balance gain may be calculated in each area, a white balance may be controlled in each area.

The electronic apparatus may further include a white balance controller that applies the white balance gain to each block in the second image. According to the configuration, since the calculated white balance gain is applied to the second image in each block, a white balance may be optimally controlled.

The electronic apparatus may further include an estimated light source color calculator that calculates a color balance in the blocks by linearly interpolating the color balance of the selected area from the second image when the flash is turned on and a color balance of the first image when the flash is turned off based on the second flash mixture ratio. The white balance calculator may calculate the white balance gain in the blocks based on the color balance calculated the blocks. According to the configuration, since a color balance is calculated in a unit of a block by linearly interpolating the color balance of the selected area from the second image when the flash is turned on and a color balance of the first image when the flash is turned off based on the second flash mixture ratio, even when a white balance gain obtained by turning on the flash is unclear, the color balance may be calculated in a unit of a block with high precision.

According to one or more embodiments, a photographing method includes: calculating an exposure difference value from a difference between an exposure control value of a first image captured when a flash is turned off and an exposure control value of a second image captured when the flash is turned on; calculating a first flash mixture ratio in blocks by comparing a signal value of the second image with a signal value of the first image, where the signal value of the second image is obtained by multiplying the signal value of the first image by the exposure difference value; selecting a block in which the first flash mixture ratio is a maximum value and selecting an area including the selected block and a block in which the first flash mixture ratio ranges between the maximum value and a threshold value; calculating a color balance of the selected area from the second image when the flash is turned on; calculating a coefficient in which the maximum value is 1 and calculating a second flash mixture ratio by multiplying the first flash mixture ratio by the calculated coefficient; and calculating a white balance gain in the blocks based on the second flash mixture ratio, the color balance calculated in the calculating of the color balance, and a color balance of normal light.

According to the configuration, since an area including the block in which a first flash mixture ratio ranges from the maximum value of first flash mixture ratios and a threshold value is selected, and the second flash mixture ratio is applied to a color balance of the selected area of the second image when a flash is turned on and a color balance of normal light so as to calculate a white balance gain, even when a white balance gain obtained by turning on the flash is unclear, an appropriate white balance gain may be calculated.

Each block of the blocks may be one pixel. The calculating of the first flash mixture ratio may include calculating the first flash mixture ratio in the pixel, and the calculating of the white balance gain may include calculating the white balance gain in the pixel. According to the configuration, since the white balance gain may be calculated in each pixel, a white balance may be controlled in each pixel.

Each block of the blocks may be an area including a plurality of pixels. The calculating of the first flash mixture ratio may include calculating the first flash mixture ratio in the area, and the calculating of the white balance gain may include calculating the white balance gain in the area. According to the configuration, since the white balance gain may be calculated in each area, a white balance may be controlled in each area.

The photographing method may further include applying the white balance gain to each block in the second image. According to the configuration, since the calculated white balance gain is applied to the second image in each block, a white balance may be optimally controlled.

The photographing method may further include calculating a color balance in the blocks by linearly interpolating the color balance of the area selected from the second image when the flash is turned on and a color balance of the first image when the flash is turned off based on the second flash mixture ratio. The calculating of the white balance gain may include calculating the white balance gain the blocks based on the color balance calculated in the blocks. According to the configuration, since a color balance is calculated in a unit of a block by linearly interpolating the color balance of the selected area from the second image when the flash is turned on and a color balance of the first image when the flash is turned off based on the second flash mixture ratio, even when a white balance gain obtained by turning on the flash is unclear, the color balance may be calculated in a unit of a block with high precision.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
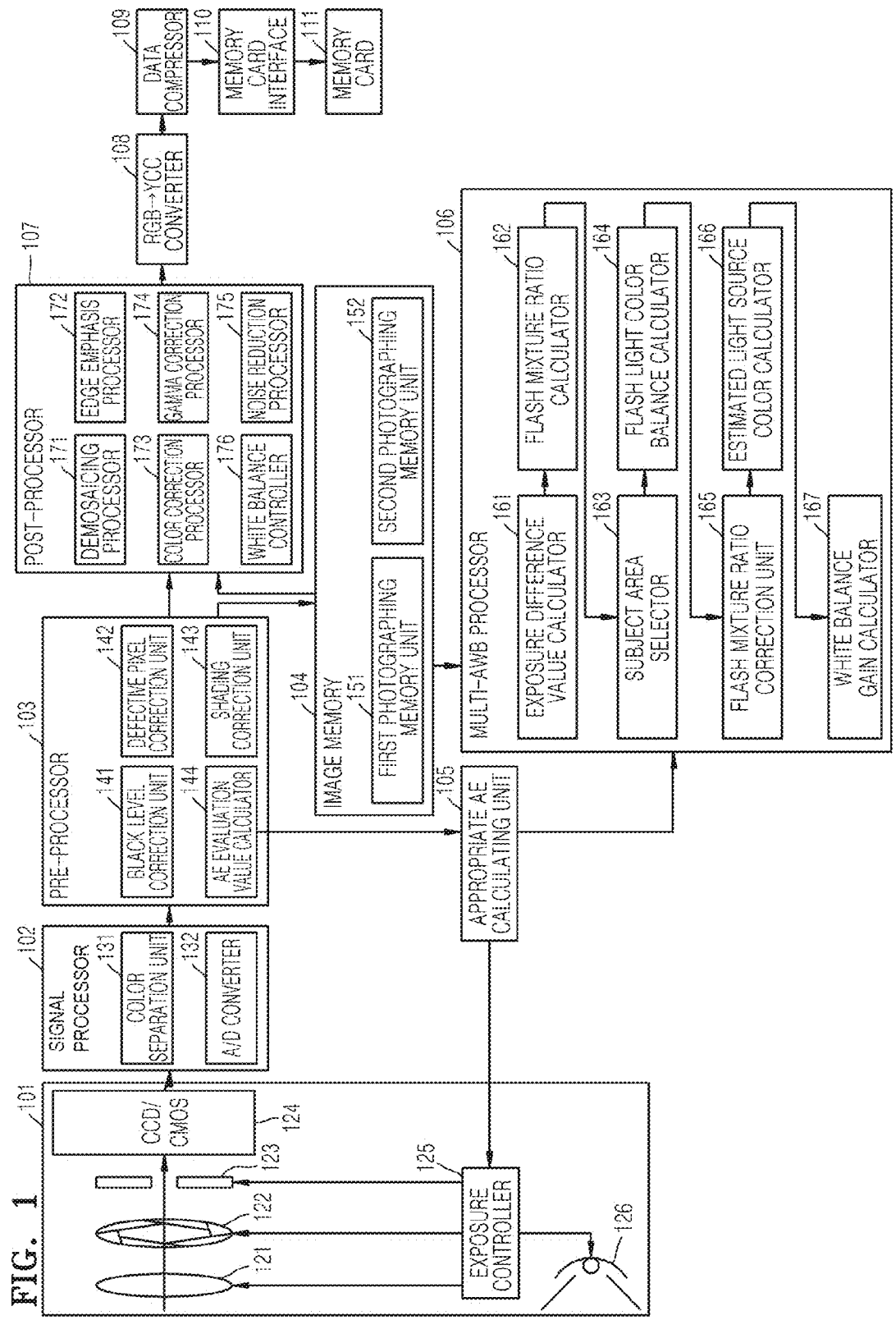
FIG. 1 is a block diagram illustrating components of a photographing apparatus, according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

In the following embodiments, a digital still camera is illustrated as an example of an electronic apparatus (e.g., a photographing apparatus), and image processing to be performed using the electronic apparatus according to an embodiment will be briefly described with reference to FIG. 1. In other embodiments, the electronic apparatus may include mobile phones, PDAs, and other electronic apparatuses having image capturing capabilities.

The electronic apparatus according to the current embodiment includes an imaging unit 101, a signal processor 102, a pre-processor 103, an image memory 104, an appropriate auto-exposure (AE) calculation unit 105, a multi-automatic white balancing (AWB) processor 106, a post-processor 107, an RGB-YCC converter 108, a data compressor 109, a memory card interface 110, and a memory card 111, as illustrated in FIG. 1.

The imaging unit 101 includes a lens 121 that focuses light from a subject, an iris 122, a shutter 123, an imaging device 124, such as a charge-coupled device (CCD) image sensor or a complementary metal-oxide semiconductor (CMOS) image sensor, an exposure controller 125, and a flash 126, as illustrated in FIG. 1.

Light that is transmitted through the lens 121 is formed on the imaging device 124 according to operating times of the iris 122 and the shutter 123, and the imaging device 124 outputs an output signal from each pixel of the image formed by imaging device 124. The exposure controller 125 controls the operating times of the iris 122, the shutter 123, the imaging device 124, and the flash 126, and performs a control operation of photographing the subject by turning on the flash 126 or photographing the subject without turning on the flash 126.

The signal processor 102 performs signal processing on the output signal output from the imaging device 124 of the imaging unit 101. The signal processor 102 includes a color separation unit 131 that performs color separation on the output signal, and an analog/digital (A/D) converter 132 that performs ND conversion on the output signal. The color separation unit 131 and the ND converter 132 perform signal processing on the output signal while being engaged with each other. As a result, the output signal output from the imaging device 124 is signal that is processed so that an RGB image signal may be obtained.

The pre-processor 103 performs pre-processing on the RGB image signal output from the signal processor 102. The pre-processor 103 includes a black level correction unit 141, a defective pixel correction unit 142, a shading correction unit 143, and an AE evaluation value calculator 144, as illustrated in FIG. 1. The RGB image signal output from the signal processor 102 is corrected in such a way that a black level of the RGB image signal is uniform by performing black level correction via the black level correction unit 141. When a pixel defect exists in the RGB image signal, the defective pixel correction unit 142 interpolates information based on information in the adjacent pixels of the pixel defect. A brightness difference of the RGB image signal output from the signal processor 102, caused by brightness omission that occurs in the vicinity of the pixel defect, is corrected by the shading correction unit 143. The AE evaluation value calculator 144 calculates an AE evaluation value based on the RGB image signal on which these correction operations has been performed. The AE evaluation value calculated by the AE evaluation value calculator 144 is output to the appropriate AE calculation unit 105. The RGB image signal on which the above-described correction operations have been performed, is output to the image memory 104 and the post-processor 107.

The image memory 104 is an example of a memory in which the RGB image signal, on which various pre-processing operations have been performed by the pre-processor 103, is stored. The image memory 104 includes a first photographing memory unit 151 in which a photographing image is captured when the flash 126 is not turned on, and a second photographing memory unit 152 in which a photographing image is captured when the flash 126 is turned on. Each of the following multi-AWB processor 106 and the post-processor 107 performs processing using each photographing image stored in the image memory 104.

The appropriate AE calculation unit 105 calculates an appropriate AE value for a photographing condition based on the AE evaluation value output from the AE evaluation value calculator 144 of the pre-processor 103. The appropriate AE calculation unit 105 outputs the calculated AE value to the exposure controller 125 of the imaging unit 101 and the multi-AWB processor 106. Thus, the exposure controller 125 may perform exposure control of the iris 122, the shutter 123, the imaging device 124, and the flash 126 based on the obtained AE value.

The multi-AWB processor 106 is a processor that calculates a white balance gain used in white balance correction. The multi-AWB processor uses the AE value calculated by the appropriate AE calculation unit 105, the photographing image captured when the flash 126 is turned off, and the photographing image captured when the flash 126 is turned on, where the photographing images are stored in the image memory 104. The multi-AWB processor 106 outputs the calculated white balance gain to a white balance controller 176 of the post-processor 107 that will be described below.

The multi-AWB processor 106 includes an exposure difference value calculator 161, a flash mixture ratio calculator 162, a subject area selector 163, a flash light color balance calculator 164, a flash mixture ratio correction unit 165, an estimated light source color calculator 166, and a white balance gain calculator 167. Although the multi-AWB processor 106 includes all of the above-described elements, embodiments are not limited thereto, and the multi-AWB processor 106 may be implemented by omitting some of the elements.

Calculation of the white balance gain, performed by the multi-AWB processor 106, will now be described in detail.

The post-processor 107 is a processor that performs various post-processing operations on the RGB image signal on which pre-processing is performed by the pre-processor 103. The post-processor 107 includes a demosaicing processor 171 that performs demosaicing (Bayer color interpolation) on the RGB image signal, an edge emphasis processor 172 that performs edge emphasis on the RGB image signal, a color correction processor 173 that performs color correction on the RGB image signal, a gamma correction processor 174 that performs gamma correction on the RGB image signal, a noise reduction processor 175 that performs noise reduction on the RGB image signal, and the white balance controller 176 that performs white balance correction on the RGB image signal. The white balance gain calculated by the multi-AWB processor 106 according to the present embodiment is input to the white balance controller 176, and the white balance controller 176 performs white balance correction on the RGB image signal by using the calculated white balance gain.

The RGB image signal, on which various post-processing operations are performed by these processors, is output to the RGB-YCC converter 108. The RGB-YCC converter 108 is a processor that converts the RGB image signal into a YCC image signal. By performing this conversion, a color space of the photographing image is transformed into a YCC (YCrCb) color space from an RGB color space. The YCC image signal after conversion is output to the data compressor 109.

The data compressor 109 is a processor that compresses the YCC image signal in various compression formats, such as Joint Photographic Experts Group (JPEG), as needed. The YCC image signal compressed as needed is stored in the memory card 111 by interposing the memory card interface 110 between the data compressor 109 and the memory card 111.

Image processing to be performed using the electronic apparatus according to the current embodiment has been briefly described above with reference to FIG. 1.

Figure 2:
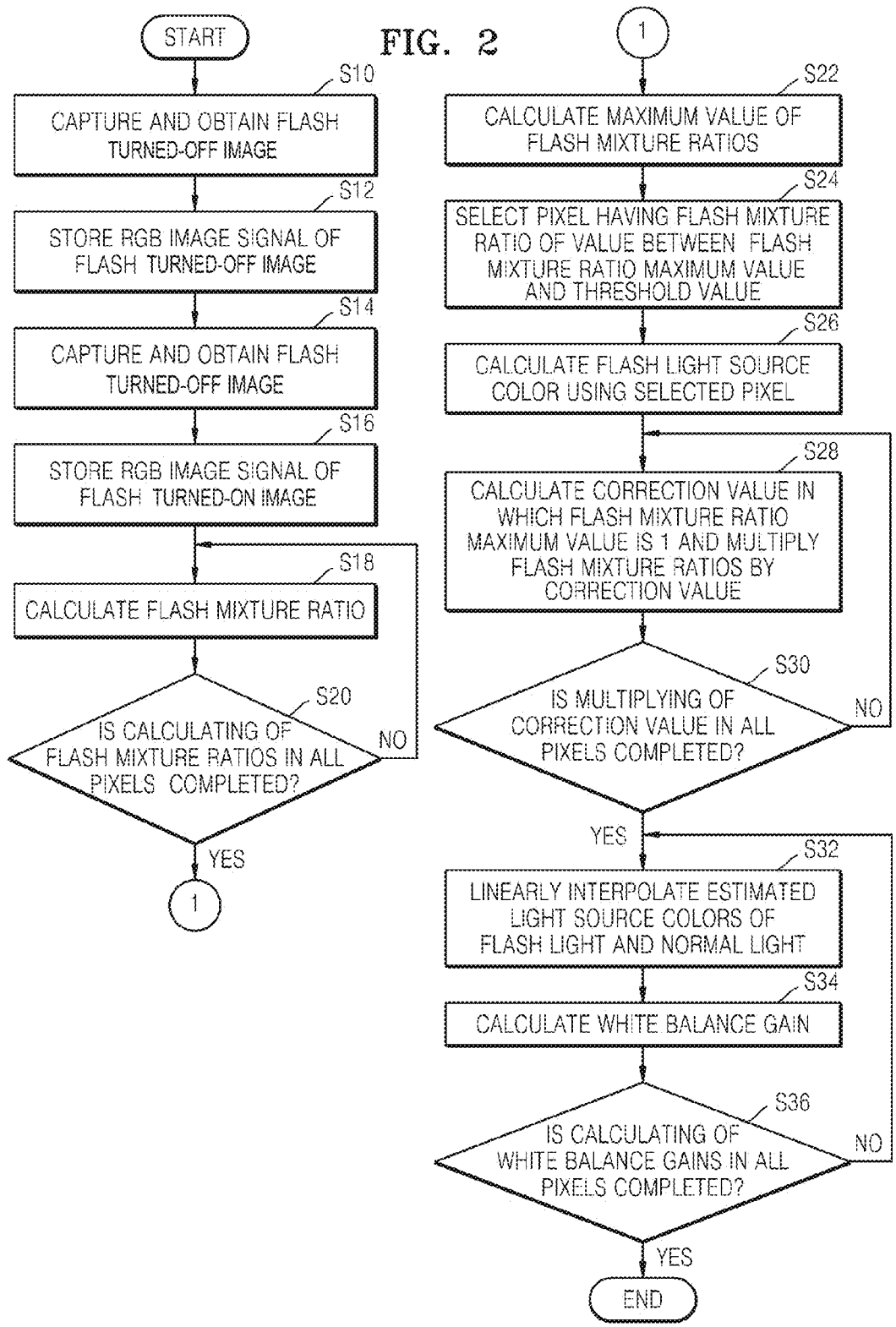
FIG. 2 is a flowchart illustrating a method of calculating of a white balance gain, according to an embodiment.

Next, calculation of the white balance gain, performed by the multi-AWB processor 106, according to the current embodiment will be described in detail. FIG. 2 is a flowchart illustrating a method of calculating of the white balance gain, according to an embodiment.

Figure 3:
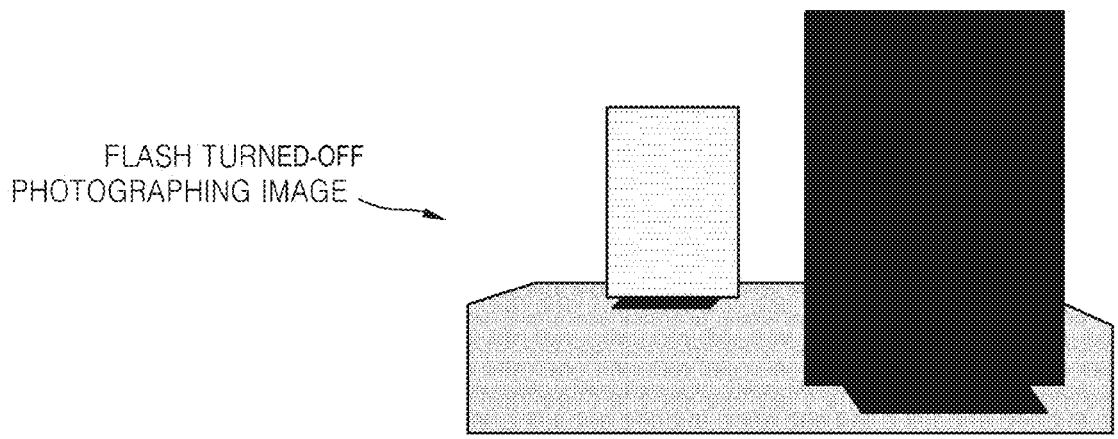
FIG. 3 is an image captured by flash turned-off photographing, according to an embodiment.

In operation S10, an image is obtained when a flash is turned off. A first image that will be an RGB image signal irradiated using normal light before the flash is turned on, as illustrated in FIG. 3, is obtained by performing photographing when the flash is turned off. In operation S12, the first image is stored in a first photographing memory unit 151 of the image memory 104.

Figure 4:
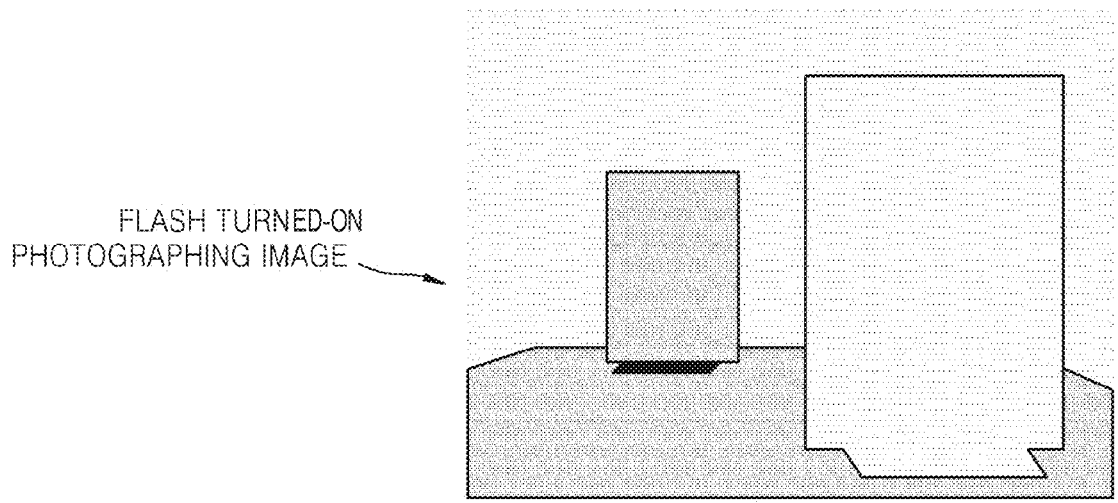
FIG. 4 is an image captured by flash turned-on photographing, according to an embodiment.

In operation S14, an image is obtained when the flash is turned on. A second image that will be an RGB image signal after the flash is turned on, as illustrated in FIG. 4, is obtained by performing photographing when the flash is turned on. In operation S16, the second image is stored in the second photographing memory unit 152 of the image memory 104.

In operation S18, a flash mixture ratio is calculated in a unit of a pixel (i.e., pixel by pixel). In operation S18, a difference between exposure control values of the first image and the second image is calculated, and the flash mixture ratio is calculated based on the difference. In operation S20, it is determined whether flash mixture ratios are calculated in all pixels, and if the calculating of flash mixture ratios in all pixels is completed, the calculating method proceeds to operation S22. On the other hand, if the calculating of the flash mixture ratios in all pixels is not completed, the calculating method returns to operation S18, and the calculating of a flash mixture ratio is continuously performed pixel by pixel.

In operation S22, a maximum value of the flash mixture ratios calculated in all pixels is obtained. In operation S24, a pixel having a flash mixture ratio of a value between the maximum value obtained in operation S20 and a threshold value, which is smaller than the maximum value, is selected.

In operation S26, a flash light source color is calculated using only the pixel selected in operation S24. In operation S28, a correction value, in which the maximum value of the flash mixture ratios is 1, is calculated in a unit of a pixel (i.e., pixel by pixel), and a new flash mixture ratio is calculated by multiplying the flash mixture ratios by the correction value. In operation S30, it is determined whether multiplying of the correction value in all pixels is completed. If multiplying of the correction value in all pixels is completed, the calculating method proceeds to operation S32. On the other hand, if multiplying of the correction value in all pixels is not completed, the calculating method returns to operation S28, and multiplying of a new correction value is continuously performed pixel by pixel.

In operation S32, estimated light source colors of flash light and normal light are linearly interpolated. In operation S34, a white balance gain is calculated in a unit of a pixel (i.e., pixel by pixel). In operation S36, it is determined whether the calculating of white balance gains in all pixels is completed. If the calculating of the white balance gains in all pixels is completed, the calculating method is terminated. On the other hand, if the calculating of the white balance gains in all pixels is not completed, processing from operation S32 is again performed.

Figure 5:
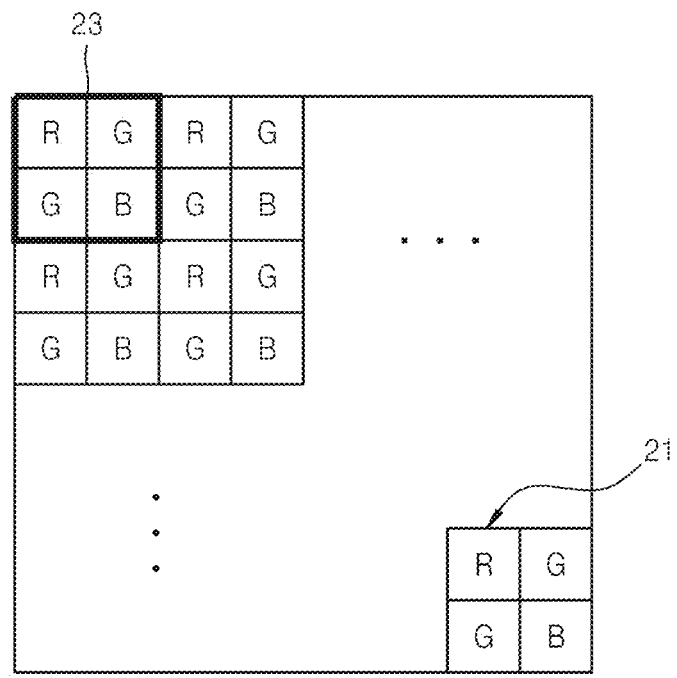
FIG. 5 is a diagram illustrating an imaging device having a Bayer arrangement, according to an embodiment.

Next, the processing operations of FIG. 2 will be described in detail. First, the photographing images input to the multi-AWB processor 106 and the handling of pixels in the photographing images will be briefly described with reference to FIGS. 3, 4, and 5. FIG. 3 is an image captured by flash turned-off photographing, FIG. 4 is an image captured by flash turned-on photographing, and FIG. 5 is a diagram illustrating an imaging device having a Bayer arrangement, according to an embodiment.

A photographing image captured when a flash is turned off (hereinafter, referred to as a flash turned-off photographing image), as an example of a first photographing image, and a photographing image captured when the flash is turned on (hereinafter, referred to as a flash turned-on photographing image), as an example of a second photographing image, are input to the multi-AWB processor 106 according to the current embodiment. The flash turned-off photographing image illustrated in FIG. 3 may have a smaller size than that of the flash turned-on photographing image illustrated in FIG. 4 due to filtering, like a live view image.

The multi-AWB processor 106 calculates estimated light source colors from an image signal of the input photographing image as will be described below. The multi-AWB processor 106 integrates an RGB image signal of the flash turned-off photographing image by RGB (color) in the entire image and calculates estimated light source colors R/G and B/G of normal light when the flash is turned off. The multi-AWB processor 106 integrates the RGB image signal of the flash turned-on photographing signal by RGB (color) in an area of the image in which a flash mixture ratio ranges from or between a maximum value to a threshold value, and calculates the estimated light source colors R/G and B/G in the area in which the flash mixture ratio ranges from or between the maximum value to the threshold value.

The multi-AWB processor 106 according to the current embodiment calculates a white balance gain in each pixel. In terms of the flash turned-on photographing image and the flash turned-off photographing image, the multi-AWB processor 106 may regard a Bayer unit 23 as one block (e.g., in which four pixels 21, such as R, G, G, and B, are set to one set). Or, the multi-AWB processor 106 may generate a pixel of each of colors R, G, and B from four pixels 21, such as R, G, G, and B, in a Bayer image by performing Bayer color interpolation (demosaicing), as illustrated in FIG. 5.

In FIG. 1, values input to the multi-AWB processor 106 are an RGB image signal input from the image memory 104 when the flash is turned off and an RGB image signal input from the image memory 104 when the flash is turned on. White balance gains output from the multi-AWB processor 106 are white balance gains calculated in all pixels, and a pixel unit is a block to which the white balance gain is applied.

In operation S18 of FIG. 2, calculation of a flash mixture ratio is performed based on the RGB image signal stored in the first photographing memory unit 151 when the flash is turned off and the RGB image signal stored in the second photographing memory unit 152 when the flash is turned on. Although calculating of the flash mixture ratio has been described to be performed in each pixel in the following description in addition to FIG. 2, calculating of the flash mixture ratio may also be performed in a unit of a block including a plurality of pixel, as described above. For example, calculation of the flash mixture ratio may be performed using the Bayer unit 23 as one block (e.g., in which four pixels 21, such as R, G, G, and B, are set to one set), or using one pixel of each of colors R, G, and B obtained by interpolating four pixels, such as R, G, G, and B, from peripheral pixels through Bayer color interpolation (demosaicing), as illustrated in FIG. 5.

When an exposure control value when the flash turned-off photographing image illustrated in FIG. 3 is captured and an exposure control value when the flash turned-on photographing image illustrated in FIG. 4 is captured do not coincide with each other, the exposure difference value calculator 161 calculates a difference between the exposure control values. The exposure control values have the relationship shown in equation 101 of Equation 1 below. In equation 101 of Equation 1, TV is a shutter speed, AV is an iris value, SV is sensitivity, and BV is subject brightness.

[Equation 1]

$$BV=TV+AV-SV \qquad \text{(equation 101)}$$

The exposure difference value calculator 161 calculates the subject brightness using equations 102 and 103 of Equation 2 below when exposure control values of photographing images are different from each other. Equation 102 of Equation 2 is used to calculate a subject brightness value $BV_f$ of the flash turned-off photographing image, and equation 103 of Equation 2 is used to calculate a subject brightness value $BV_s$ of a flash turned-on reduction image.

[Equation 2]

$$BV_l = TV_l + AV_l - SV_l \quad \text{(equation 102)}$$

$$BV_s = TV_s + AV_s - SV_s \quad \text{(equation 103)}.$$

When calculating of the subject brightness value based on equations 102 and 103 is completed, the exposure difference value calculator 161 calculates a difference $BV_{diff}$ using the obtained calculation result based on equation 104 of Equation 3 below. When the exposure control value of the flash turned-off photographing image and the exposure control value of the flash turned-on photographing image coincide with each other, a value of the difference $BV_{diff}$ shown in the following equation 104 is 0:

[Equation 3]

$$BV_{diff} = BV_s - BV_l \quad \text{(equation 104)}.$$

If the difference $BV_{diff}$ is calculated, the exposure difference value calculator 161 calculates an exposure difference value Lf using equation 105 of the following Equation 4.

[Equation 4]

$$Lf = 2^{BV_{diff}} \quad \text{(equation 105)}.$$

If the exposure difference value Lf is calculated, the exposure difference value calculator 161 outputs the obtained calculation result to the flash mixture ratio calculator 162.

The flash mixture ratio calculator 162 calculates a first flash mixture ratio in a unit of a pixel based on a signal value of the flash turned-on reduction image, which is obtained by multiplying a signal value of the flash turned-off photographing image by the exposure difference value. The first flash mixture ratio is calculated as a relative value when the amount of normal light in the flash turned-off photographing image is 1. When a brightness value is used as the signal value, the first flash mixture ratio Ratio may be calculated using equation 106 of the following Equation 5:

[Equation 5]

$$\text{Ratio} = 1 - \frac{Y_l}{Lf \times Y_s}. \quad \text{(equation 106)}$$

In equation 106, $Y_l$ is a brightness value of each pixel in the flash turned-off photographing image, and $Y_s$ is a brightness value of each pixel in the flash turned-on reduction image.

Since a green (G) signal value is one of the color signal values that is almost the same as the brightness value Y, the flash mixture ratio calculator 162 may calculate the first flash mixture ratio using the G signal value instead of the brightness value Y in equation 106. The first flash mixture ratio calculated by the flash mixture ratio calculator 162 is fixed between 0.0 and 1.0.

The flash mixture ratio calculator 162 calculates the first flash mixture ratio by taking into consideration the noise or misalignment of positions of the flash turned-off photographing image and the flash turned-on photographing image. The first flash mixture ratio is transmitted to the subject area selector 163 from the flash mixture ratio calculator 162.

Figure 6:
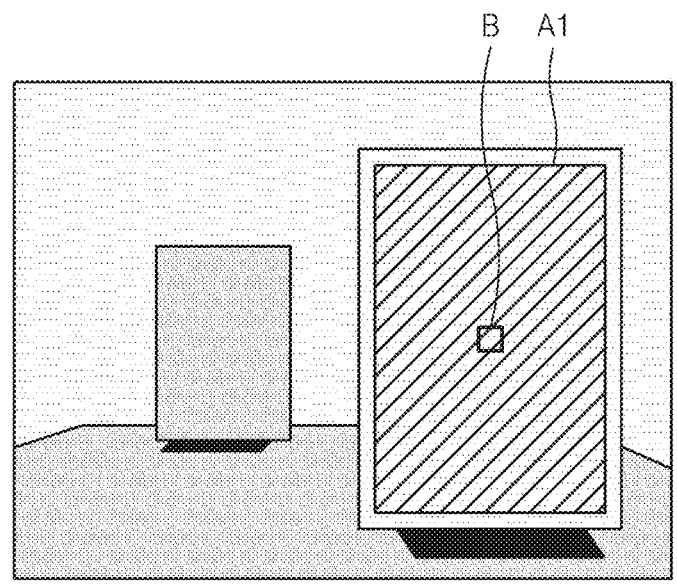
FIG. 6 is a diagram illustrating an area selected by a subject area selector, according to an embodiment.

FIG. 6 is a diagram illustrating an area selected by the subject area selector 163, according to an embodiment. The subject area selector 163 selects a maximum value $\text{Ratio}_{MAX}$ of flash mixture ratios from among the first flash mixture ratios calculated in a unit of a pixel. The subject area selector 163 also selects a block that ranges between the maximum value $\text{Ratio}_{MAX}$ of flash mixture ratios to a threshold value T centering on a block B in which the maximum value $\text{Ratio}_{MAX}$ of flash mixture ratios exists, as illustrated as an area A1 (with diagonal lines) of FIG. 6. In this case, the subject area selector 163 may select all blocks that range between the maximum value $\text{Ratio}_{MAX}$ of the first flash mixture ratios to the threshold value T within the entire image, or, the subject area selector 163 may select only a block continued from a block having a maximum value from among blocks that range between the maximum value $\text{Ratio}_{MAX}$ of flash mixture ratios to the threshold value T. For example, when the maximum value is 100%, a value obtained by reducing about 10% to about 20% from 100% of the maximum, i.e., a value that corresponds to about 80% to about 90% of the maximum value, may be used as the threshold value T.

Next, the flash light color balance calculator 164 calculates a color balance CB of flash light when the flash is turned on in the area selected by the subject area selector 163 (e.g., the area A1 illustrated in FIG. 6). The flash light color balance calculator 164 adds pixels in the area A1 to each of R, G, and B colors so as to calculate $R/G (=CB_{fr})$ and $B/G (=CB_{fb})$. Since the white balance gain is G/R or G/B and the color balance CB is an inverse number of the white balance gain, the flash light color balance calculator 164 calculates R/G and B/G.

A method of calculating the color balance, performed by the flash light color balance calculator 164, is performed using an algorithm based on Gray World Assumption of an auto white balance. For example, a color is determined from a color balance of a block within the area A1, and a block determined to have a chromatic color is excluded from selection, thereby selecting only a block having a similar color to a light source color. Thus, a more accurate color balance may be calculated by excluding the effect of the chromatic color.

The color balance calculated by the flash light color balance calculator 164 is transmitted to the flash mixture ratio correction unit 165. The flash mixture ratio correction unit 165 calculates a coefficient of $1/\text{Ratio}_{MAX}$ in which the maximum value of flash mixture ratios obtained by the subject area selector 163 is 1, using equation 107 of the following Equation 6. The flash mixture ratio correction unit 165 multiplies a first flash mixture ratio of all blocks by the calculated coefficient of $1/\text{Ratio}_{MAX}$ so as to calculate a second flash mixture ratio Ratio':

[Equation 6]

$$\text{Ratio}' = \frac{1}{\text{Ratio}_{Mix}} \times \text{Ratio}. \quad \text{(equation 107)}$$

The second flash mixture ratio Ratio' calculated by the flash mixture ratio correction unit 165 is transmitted to the estimated light source color calculator 166. The estimated light source color calculator 166 linearly interpolates the estimated light source color of flash light CBf and the estimated light source color of normal light CBs calculated by the flash light color balance calculator 164, and obtains an estimated light source color CB of a pixel using equations 108 and 109 of Equation 7 below. The estimated light source color (color balance) of normal light may be obtained by the electronic apparatus and may be stored in advance. Here, the estimated light source color CB is individually obtained from R and B. Thus, an estimated light source color $CB_r$ of R and an estimated light source color $CB_b$ of G are calculated.

[Equation 7]

$$CB_r = (\text{Ratio}' \times CB_{fr}) + ((1 - \text{Ratio}') \times CB_{sr}) \quad \text{(equation 108)}$$

$$CB_b = (\text{Ratio}' \times CB_{fb}) + ((1 - \text{Ratio}') \times CB_{sb}) \quad \text{(equation 108)}.$$

The estimated light source color $CB_r$ of R and the estimated light source color $CB_b$ of G, obtained using equations 108 and 109, are transmitted to the white balance gain calculator 167 from the estimated light source color calculator 166. The white balance gain calculator 167 calculates white balance gains $WBGain_R$ and $WBGain_B$ of a target pixel using equations 110 and 111 of the following Equation 8:

[Equation 8]

$$WBGain_R = \frac{1}{CB_r} \quad \text{(equation 110)}$$

$$WBGain_B = \frac{1}{CB_b}. \quad \text{(equation 111)}$$

The white balance gain calculator 167 performs arithmetic operations of equations 110 and 111 on all pixels, thereby obtaining an appropriate white balance gain in a unit of a pixel in a scene in which flash light and normal light are mixed.

The white balance gains obtained by the white balance gain calculator 167 in a unit of a pixel are transmitted to the white balance controller 176 of the post-processor 107. The white balance controller 176 multiplies the white balance gains obtained in a unit of a pixel by each pixel value using equations 112 and 113 of the Equation 9 below. Thus, the white balance controller 176 may perform appropriate white balance correction on a photographing image captured even in a photographing environment in which flash light and normal light are mixed.

[Equation 9]

$$R = WBGain_B \times R \quad \text{(equation 112)}$$

$$B = WBGain_B \times B \quad \text{(equation 113)}.$$

As described above, since, in the related art, a color balance of flash light is used even when the color balance of flash light is unclear, an appropriate white balance gain is calculated. According to the one or more of the above embodiments, the subject area A1 is selected based on the flash mixture ratio, and the color balance is calculated within the subject area A1 so as to optimize color balances of flash light and normal light at a second flash mixture ratio. Thus, even when a white balance gain of flash light is not previously determined, such as when bounce photographing or when an externally-installed flash is used, an appropriate white balance gain may be calculated.

As described above, according to the one or more of the above embodiments, even when a white balance gain obtained by turning on a flash is unclear, in other words, an externally-installed flash is used or flash light is not directly irradiated on a subject, such as in bounce emission, an appropriate white balance gain may be calculated.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. An electronic apparatus comprising:
an exposure difference value calculator that calculates an exposure difference value from a difference between an exposure control value of a first image captured when a flash is turned off and an exposure control value of a second image captured when the flash is turned on;
a flash mixture ratio calculator that calculates a first flash mixture ratio in blocks by comparing a signal value of the second image with a signal value of the first image, wherein the signal value of the second image is obtained by multiplying the signal value of the first image by the exposure difference value;
a subject area selector that selects a block in which the first flash mixture ratio is a maximum value, and selects an area comprising the selected block and a block in which the first flash mixture ratio ranges between the maximum value and a threshold value;
a flash light color balance calculator that calculates a color balance of the selected area from the second image when the flash is turned on;
a flash mixture ratio correction unit that calculates a coefficient in which the maximum value is 1 and calculates a second flash mixture ratio by multiplying the first flash mixture ratio by the calculated coefficient; and
a white balance gain calculator that calculates a white balance gain in the blocks based on the second flash mixture ratio, the color balance calculated by the flash light color balance calculator, and a color balance of normal light.

2. The electronic apparatus of claim 1, wherein:
each block of the blocks comprises one pixel;
the flash mixture ratio calculator calculates the first flash mixture ratio in the pixel; and
the white balance gain calculator calculates the white balance gain in the pixel.

3. The electronic apparatus of claim 1, wherein:
each block of the blocks is an area comprising a plurality of pixels;
the flash mixture ratio calculator calculates the first flash mixture ratio in the area;
the white balance calculator calculates the white balance gain in the area.

4. The electronic apparatus of claim 1, further comprising a white balance controller that applies the white balance gain to each block of the second image.

5. The electronic apparatus of claim 1, further comprising an estimated light source color calculator that calculates a color balance in the blocks by linearly interpolating the color balance of the selected area from the second image when the flash is turned on and a color balance of the first image when the flash is turned off based on the second flash mixture ratio,
wherein the white balance calculator calculates the white balance gain in the blocks based on the color balance calculated in the blocks.

6. The electronic apparatus of claim 1, wherein the signal value is a brightness value.

7. The electronic apparatus of claim 1, wherein the signal value is a green pixel value.

8. A photographing method comprising:
calculating an exposure difference value from a difference between an exposure control value of a first image captured when a flash is turned off and an exposure control value of a second image captured when the flash is turned on;
calculating a first flash mixture ratio in blocks by comparing a signal value of the second image with a signal value of the first image, wherein the signal value of the second image is obtained by multiplying the signal value of the first image by the exposure difference value;
selecting a block in which the first flash mixture ratio is a maximum value and selecting an area comprising the selected block and a block in which the first flash mixture ratio ranges between the maximum value and a threshold value;
calculating a color balance of the selected area from the second image when the flash is turned on;
calculating a coefficient in which the maximum value is 1 and calculating a second flash mixture ratio by multiplying the first flash mixture ratio by the calculated coefficient; and
calculating a white balance gain in the blocks based on the second flash mixture ratio, the calculated color balance, and a color balance of normal light.

9. The photographing method of claim 8, wherein:
each block of the blocks comprises one pixel;
the calculating of the first flash mixture ratio comprises calculating the first flash mixture ratio in the pixel; and
the calculating of the white balance gain comprises calculating the white balance gain in the pixel.

10. The photographing method of claim 8, wherein:

each block of the blocks is an area comprising a plurality of pixels;

the calculating of the first flash mixture ratio comprises calculating the first flash mixture ratio in the area; and the calculating of the white balance gain comprises calculating the white balance gain in the area.

11. The photographing method of claim 8, further comprising applying the white balance gain to each block in the second image.

12. The photographing method of claim 8, further comprising calculating a color balance in the blocks by linearly interpolating the color balance of the selected area from the second image when the flash is turned on and a color balance of the first image when the flash is turned off based on the second flash mixture ratio, wherein the calculating of the white balance gain comprises calculating the white balance gain in the blocks based on the color balance calculated in the blocks.

13. The photographing method of claim 8, wherein the signal value is a brightness value.

14. The photographing method of claim 8, wherein the signal value is a green pixel value.

15. An electronic apparatus comprising:

an exposure difference value calculator that calculates an exposure difference value from a difference between an exposure control value of a first image captured when a flash is turned off and an exposure control value of a second image captured when the flash is turned on;

a flash mixture ratio calculator that calculates a first flash mixture ratio in a block by comparing a signal value of the second image with a signal value of the first image, wherein the signal value of the second image is obtained by multiplying the signal value of the first image by the exposure difference value;

a subject area selector that selects a block in which the first flash mixture ratio is a maximum value and selects an area comprising the selected block and a block in which the first flash mixture ratio ranges between the maximum value and a threshold value;

a flash light color balance calculator that calculates a color balance of the selected area from the second image when the flash is turned on; and a white balance gain calculator that calculates a white balance gain in the blocks based on the second flash mixture ratio, the color balance calculated by the flash light color balance calculator, and a color balance of normal light.

* * * * *